March 3, 1942.  D. L. SHANKLIN ET AL  2,275,235
SEAL FOR CONTAINERS
Filed Aug. 4, 1936
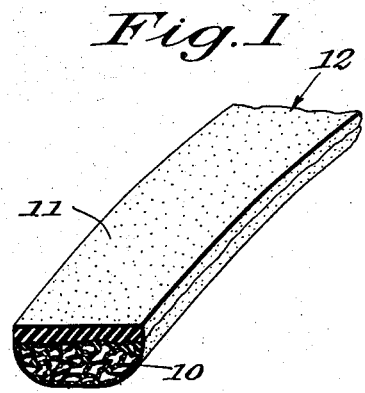
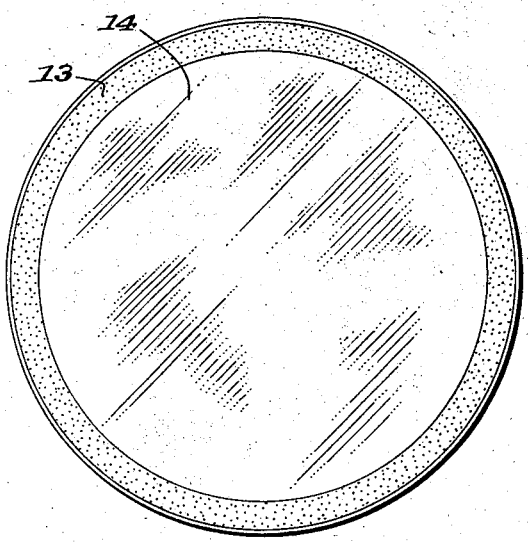
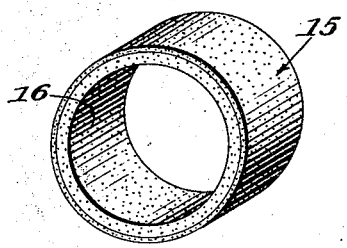
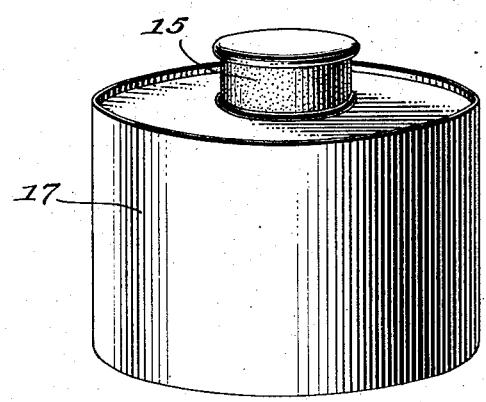
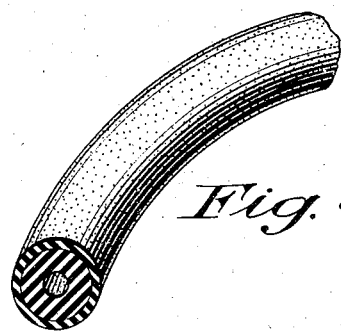
Inventors:
Dunbar L. Shanklin and
W. Campbell Ross
By Theodore C. Browne
Attorney.

Patented Mar. 3, 1942

2,275,235

UNITED STATES PATENT OFFICE 2,275,235

SEAL FOR CONTAINERS

Dunbar L. Shanklin and William Campbell Ross, Winchester, Mass., assignors to Dewey and Almy Chemical Company, North Cambridge, Mass., a corporation of Massachusetts Application August 4, 1936, Serial No. 94,190

7 Claims. (Cl. 220—46)

This invention relates to the sealing of containers and provides a novel means for producing a dependable vacuum tight seal.

Compositions which are used in the sealing of cans are usually plastic substances, which can be forced into conformity with the entire contour of the double seam, thus rendering the can vacuum tight. Modern industrial methods produce remarkably uniform can parts, and compound applying machinery is so accurate that a tolerance of 1 or 2 milligrams in the weight of the sealing element is now common in commercial manufacture. In addition, the contours of the seaming rolls are accurately maintained, so that in practice virtually constant pressures are applied to the plastic material in the seam.

In larger containers, however, such accuracy is impossible, for, despite all possible care, the heavy metal is not absolutely true in gauge, nor can the drawing and rolling operations be as accurate as in the manufacture of lighter cans. In consequence, sealing material used in larger containers is called upon to fill wide gaps and to compensate for material surface irregularities. These the functions which a plastic substance is not well suited to perform. The high pressure which is applied between two high spots has the effect of relieving the pressure in adjacent low areas whenever an all-plastic material is used as the sealing element, and such seals may leak and lose the vacuum in the container. Yet, plastic seals are inherently more dependable when vacuum must be maintained.

Another objectionable feature of plastic material, when used in sealing a pail or barrel, is that a large amount of compound may flow or be extruded from the seam under the pressure of sealing. This is unsightly, may tear the label, and is commercially highly objectionable, since the customer gains the impression that the contents have leaked. Accordingly, it has become customary to make the sealing element compressible, but, since rubber is substantially an incompressible substance, it is necessary to make the sealing element of a rubber sponge or of a tube, the bore of which permits compression. Neither of these two forms of gaskets can be relied upon for a vacuum seal. The cells in the sponge rubber are often broken in compression and leave small channels through which the atmosphere may enter, while the tube type gasket, if it is to be made at any reasonable cost, has a joint which occasionally forms a passage through which the atmosphere also may find entrance. Both of these gaskets are inherently expensive and, further, they must be stuck to the closure with some adhesive composition, a second operation which materially increases expense.

Certain types of containers, notably, the vent type cheese cans, are designed to release whatever gases are generated by the can contents, and to prevent the ingress of air, bacteria, or dust. Such cans are formed with a vented neck around which is fitted a rubber band, which covers the vents or openings, to produce a tight seal, capable, however, of acting as a valve to release gases generated within the can. In practice, however, the sealing effect has not been commercially dependable.

Certain objects of this invention are to provide a gasket capable of producing a dependable vacuum type seal which will compensate for all manufacturing irregularities and lack of accuracy in the container; to provide a gasket which can be manufactured cheaply, and be applied to the container easily and with little expense. Other objects of this invention are to improve the dependability of tube type sealing gaskets, and to improve the sealing characteristics of the valve element of vented cans.

These and other objects will become apparent from the specification and from the drawing in which Fig. 1 illustrates (partially in section) one form of our improved gasket particularly adapted for the sealing of large pails or barrels. Fig. 2 shows the gasket of Fig. 1 as applied to the cover of the container. Fig. 3 is a perspective view showing our improved sealing element for vent type cans. Fig. 4 illustrates the element as applied to the conventional vent type cans, and, Fig. 5 (partially in section) shows the construction of our improved tube type sealing gasket.

In carrying out our invention we provide a sealing gasket of deformable plastic material, but we force this into intimate, uniform contact with the body of the container by means of a compressible but resilient substance which may force the plastic into any gaps or irregularities in the area to be sealed.

More concretely, in forming a sealing element for a barrel or pail, we prefer to flow into the channel of the cover a latex compound made as described in the application of McGowan and Puschin, Serial No. 755, 242, now Patent No. 2,114,308 dated April 19, 1938, using for its application the apparatus which is also described. These partially lined covers are then placed in a drying oven for approximately 1 hour and then allowed to cool. They are then run through a second cover lining machine which applies immediately over the now spongy gasket a plastic sealing material. This may be any well-known type of a non-adhesive, plastic sealing substance, such as glue glycerine mixtures, asphalt, or rubber derived from a "solvent" mixture, but we prefer to use as the plastic material a sealing substance made according to Patent No. 2,013,177 or Patent No. 2,047,977. The material contains no sulphur or accelerators. The covers, after the second lining operation, are again sent through the dryer so that the cure of the partially vulcanized sponge rubber is now made complete and the plastic sealing material is thoroughly dried. If the plastic sealing substance contains rubber, either as latex or in a "dissolved" form, the area which is immediately adjacent the sponge rubber will steal a small amount of sulphur from the sponge and become vulcanized as well. Thus, a rubber-base plastic substance and the compressible packing become inseparably united. We illustrate this in Figs. 1 and 2. In Fig. 1 the resilient vulcanized sponge 10 is covered with a non-porous layer of plastic sealing material 11. The shape of the gasket 12 which is so formed is always determined by the contour of the channel 13 of the cover 14.

Our invention takes another form when applied to vent type containers where the valve element 15, Fig. 3, is essentially a rubber elastic band lined with a plastic sealing compound 16. In manufacturing these valves, we find it convenient to retain the vulcanized rubber tube on the mandrel upon which it was cured and then dip the tube in a tank of the plastic composition. Alternatively, it is possible to coat the tube by any painting operation. The coated tube is then placed against a battery of slitter knives and rings or bands 15 cut from the tube. The rings are then turned inside out and are applied to the vent type can 17, as shown in Fig. 4.

The sealing ability of the conventional rubber tube sealing gasket is materially improved by the modification of our invention which we illustrated in Fig. 5. Tubing for the conventional gaskets is usually made by the extrusion process, and is cut to the proper length to fit the channel of a container cover. The ends are joined by a small pin inserted in the bore of the tube. Only the deformation of the tube under pressure has, in the past, been relied upon to close the gap where the tube is joined.

We pass long lengths of such tubing through a tank of plastic compound previously described, and then apply this material to covers in the otherwise conventional manner. The plastic nature of the coating composition allows very considerable deformation and much more intimate contact of the sealing mass with the rim of a container than previously has been possible. Furthermore, the plastic material under compression flows across the joint and securely closes the gap. Our improved gaskets form dependable, vacuum tight seals which may be depended upon to preserve such delicate products as vacuum-packed coffee, fountain syrups, etc.

We claim:

1. A unitary sealing gasket for containers comprising a resilient, compressible portion of vulcanized sponge rubber and a non-adhesive sealing portion of an unvulcanized non-porous plastic compound.

2. In combination, a container closure having a channel formed around the periphery thereof, and a sealing gasket arranged in said channel comprising a ring of resilient, compressible material located in the bottom of said channel and a ring of non-adhesive plastic compound covering said compressible ring.

3. In combination, a container closure having a channel formed around the periphery thereof, and a sealing gasket arranged in said channel comprising a ring of vulcanized sponge rubber located in the bottom of said channel and a ring of non-adhesive plastic compound covering said sponge rubber.

4. In combination, a container closure having a channel formed at the periphery thereof, and a sealing gasket located in said channel, said gasket comprising a ring of resilient, compressible material located in the lower part of said channel and having been formed in situ, and a ring of non-adhesive plastic compound covering said ring of compressible material and having been formed in situ.

5. In combination, a container closure having a channel formed at the periphery thereof, and a sealing gasket located in said channel, said gasket comprising a ring of vulcanized sponge rubber located in the lower part of said channel and having been formed in situ, and a ring of non-adhesive plastic compound covering said ring of sponge rubber in the upper part of said channel and having been formed in situ.

6. A sealing element for containers comprising an annulus of vulcanized rubber, and an outer coating on said annulus comprising an intimate mixture of rubber and a substance imparting plasticity to said mixture.

7. A sealing element for containers comprising an annulus of vulcanized rubber and a coating in adhering contact with at least one face of said annulus, said coating comprising an intimate mixture of rubber and a substance imparting plasticity to said mixture.

DUNBAR L. SHANKLIN.
WILLIAM CAMPBELL ROSS.